(12) United States Patent
Von Davier et al.

(10) Patent No.: US 8,639,176 B2
(45) Date of Patent: Jan. 28, 2014

(54) MIXTURE GENERAL DIAGNOSTIC MODEL

(75) Inventors: Matthias Von Davier, Lawrenceville, NJ (US); Kentaro Yamamoto, Lawrenceville, NJ (US); Xueli Xu, Plainsboro, NJ (US)

(73) Assignee: Educational Testing System, Princeton, NJ (US)

( * ) Notice: Subject to any disclaimer, the term of this patent is extended or adjusted under 35 U.S.C. 154(b) by 1384 days.

(21) Appl. No.: 11/852,075

(22) Filed: Sep. 7, 2007

(65) Prior Publication Data

US 2008/0076108 A1    Mar. 27, 2008

Related U.S. Application Data

(60) Provisional application No. 60/824,837, filed on Sep. 7, 2006.

(51) Int. Cl.
*G09B 7/00* (2006.01)

(52) U.S. Cl.
USPC ........... 434/350; 434/118; 434/322; 434/323; 434/353

(58) Field of Classification Search
CPC .......................................................... G09B 7/00
USPC ........................... 434/118, 322, 323, 350, 353
See application file for complete search history.

(56) References Cited

U.S. PATENT DOCUMENTS

| | | | |
|---|---|---|---|
| 5,059,127 A | | 10/1991 | Lewis et al. |
| 6,105,046 A * | | 8/2000 | Greenfield et al. ........... 715/207 |
| 6,144,838 A * | | 11/2000 | Sheehan ........................ 434/362 |
| 6,301,571 B1 * | | 10/2001 | Tatsuoka .......................... 706/45 |
| 6,322,366 B1 | | 11/2001 | Bergan et al. |
| 2002/0128884 A1 | | 9/2002 | Heching et al. |
| 2003/0232314 A1 * | | 12/2003 | Stout et al. .................... 434/322 |
| 2004/0202987 A1 * | | 10/2004 | Scheuring et al. ............ 434/118 |
| 2005/0222799 A1 * | | 10/2005 | Bolt et al. ..................... 702/127 |
| 2006/0003303 A1 * | | 1/2006 | Almond et al. ............... 434/322 |
| 2006/0014129 A1 * | | 1/2006 | Coleman et al. .............. 434/322 |
| 2006/0035207 A1 | | 2/2006 | Henson |
| 2006/0099561 A1 | | 5/2006 | Griph |
| 2008/0021576 A1 | | 1/2008 | Davier et al. |

OTHER PUBLICATIONS

Vermunt, Jeroen K., Multilevel Latent Class Models; Sociological Methodology; vol. 33; No. 1; Jan. 2003; pp. 213-239.
McGlohen, Meghan Kathleen; The Application of a Cognitive Diagnosis Model via an Analysis of a Large-Scale Assessment and a Computerized Adaptive Testing Administration; Dissertation, University of Texas at Austin; May 2004.
Rost, Jurgen; A Logistic Mixture Distribution Model for Polychotomous Item Responses; British Journal of Mathematical and Statistical Psychology; vol. 44; pp. 75-92; 1991.
Andrich, David; Rasch Models for Measurement; Sage University Papers, Quantitative Applications in the Social Sciences; No. 07-068; 2002.

(Continued)

*Primary Examiner* — Sam Yao
*Assistant Examiner* — Alvin Carlos
(74) *Attorney, Agent, or Firm* — Jones Day

(57) ABSTRACT

Disclosed herein is a method of analyzing examinee item response data comprising constructing a diagnosis model for reporting skill profiles of examinees, wherein the diagnosis model comprises at least a variable representing unobserved subpopulations, creating an item design matrix, distributing examinees across the unobserved subpopulations, iteratively estimating values for a plurality of variables within the diagnosis model, and reporting the estimated values to a user.

57 Claims, 2 Drawing Sheets

(56) References Cited

OTHER PUBLICATIONS

Yamamoto, Kentaro; Hybrid Model of IRT and Latent Class Models; Research Report, Educational Testing Service, RR-89-41; New Jersey; Sep. 1989.

Yamamoto, Kentaro; A Model that Combines IRT and Latent Class Models; University of Illinois; Illinois; 1987.

Andrich, David; An Extension of the Rasch Model for Ratings Providing Both Location and Dispersion Parameters; Psychometrika; vol. 47, No. 1; pp. 105-113; Mar. 1982.

Kelderman, Hendrikus; Loglinear Rasch Model Tests; Psychometrika; vol. 49, No. 2; pp. 223-245; Jun. 1984.

Rost, Jurgen; Rasch Models in Latent Classes: An Integration of Two Approaches to Item Analysis; Applied Psychological Measurement; vol. 14, No. 3; pp. 271-282; Sep. 1990.

Masters, Geoff N.; Rasch Model for Partial Credit Scoring; Psychometrika; vol. 47, No. 2; pp. 149-174; Jun. 1982.

Birnbaum, A.; Some Latent Trait Models; In F.M. Lord & M.R. Novick (Eds.), Statistical Theories of Mental Test Scores; Reading, MA: Addison-Wesley; 1968.

Von Davier, M.; A General Diagnostic Model Applied to Language Testing Data; Princeton: Educational Testing Service; ETS RR-05-16; Sep. 2005.

Von Davier, M., Yamamoto, K.; Partially Observed Mixtures of IRT Models: An Extension of the Generalized Partial Credit Model; Princeton: Educational Testing Service; ETS RR-03-22; Aug. 2003.

Von Davier, M., Yamamoto, K.; A Class of Models for Cognitive Diagnosis—and Some Notes on Estimation; ETS Tucker Works Seminar; Princeton, NJ; Dec. 2, 2004.

Haberman, S.J.; Qualitative Data Analysis: vol. 2, New Developments; New York: Academic Press; 1979.

Maris, E.; Estimating Multiple Classification Latent Class Models; Psychometrika; 64(2); pp. 187-212; 1999.

Muraki, E.; A Generalized Partial Credit Model: Application of an EM Algorithm; Applied Psychological Measurement; 16(2); pp. 159-176; 1992.

Von Davier, M., Yamamoto, K.; Mixture Distribution and Hybrid Rasch Models; In M. von Davier & C.H. Carstensen (Eds.), Multivariate and Mixture Distribution Rasch Models; New York: Springer; pp. 99-115; 2007.

Xu, X., Von Davier, M.; Cognitive Diagnosis for NAEP Proficiency Data; Princeton: New Jersey; ETS RR-06-08; 2006.

Haertel, E.H.; Student Achievement Tests as Tools of Educational Policy: Practices and Consequences; In B.R. Gifford (Ed.), Test Policy and Test Performance: Education, Language, and Culture; Boston: Kluwer Academic Publishers; pp. 25-50; 1989.

Von Davier, M., Rost, J.; Mixture Distribution Item Response Models; Handbook of Statistics, vol. 26; pp. 643-661; Jul. 2005.

Vermunt, J.K.; Multilevel Latent Class Models; Sociological Methodology; vol. 33; No. 1; pp. 213-239; Jan. 2003.

Von Davier, M.; Mixture Distribution Diagnostic Models; Princeton: Educational Testing Service; ETS RR-07-32; Jul. 2007.

\* cited by examiner

MIXTURE GENERAL DIAGNOSTIC MODEL

REFERENCE TO RELATED APPLICATIONS

This application claims priority to U.S. Application No. 60/824,837, filed Sep. 7, 2006, and entitled "Mixture General Diagnostic Model."

BACKGROUND OF INVENTION

Item Response Theory (IRT) is a body of theory used in the field of psychometrics. In IRT, mathematical models are applied to analyze data from tests or questionnaires in order to measure abilities and attitudes studied in psychometrics. One branch of IRT is diagnostic models. Diagnostic models may be used to provide skill profiles, thereby offering additional information about the examinees. One central tenet behind diagnostic models is that different items tap into different sets of skills or examinee attributes and that experts can generate a matrix of relations between items and skills required to solve these items. A diagnostic model according to the prior art, the General Diagnostic Model (GDM), will hereinafter be described.

In order to define the GDM, several assumptions must first be presented. Assume an I-dimensional categorical random variable $\vec{x}=(x_1, \ldots, x_I)$ with $x_i \in \{0, \ldots, m_i\}$ for $i \in \{1, \ldots, I\}$, which may be referred to as a response vector. Further assume that there are N independent and identically distributed (i.i.d.) realizations $\vec{x}_1, \ldots, \vec{x}_N$ of this random variable $\vec{x}$, so that $x_{ni}$ denotes the i-th component of the n-th realization $\vec{x}_n$. In addition, assume that there are N unobserved realizations of a K-dimensional categorical variable, $\vec{a}=(a_1, \ldots, a_K)$, so that the vector $$(\vec{x}_n, \vec{a}_n) = (x_{n1}, \ldots, x_{nI}, a_{n1}, \ldots, a_{nK})$$

exists for all $n \in \{1, \ldots, N\}$ The data structure $$(X, A) = ((\vec{x}_n, \vec{a}_n))_{n=1, \ldots, N}$$

may be referred to as the complete data, and $(\vec{x}_n) = ((\vec{x}_n, \vec{a}_n))_{n=1, \ldots, N}$ is referred to as the observed data matrix. Denote $(\vec{a}_n)_{n=1, \ldots, N}$ as the latent skill or attribute patterns, which is the unobserved target of inference.

Let $P(\vec{a})=P(\vec{A}=(a_1, \ldots, a_K))>0$ for all $\vec{a}$ denote the nonvanishing discrete count density of $\vec{a}$. Assume that the conditional discrete count density $P(x_1, \ldots, x_I | \vec{a})$ exists for all $\vec{a}$. Then the probability of a response vector $\vec{x}$ can be written as $$P(\vec{x}) = \sum_{\vec{a}} P(\vec{a}) P(x_1, \ldots, x_I | \vec{a})$$

Thus far, no assumptions have been made about the specific form of the conditional distribution of $\vec{x}$ given $\vec{a}$, other than that $P(x_1, \ldots, x_I | \vec{a})$ exists. For the GDM, local independence (LI) of the components $\vec{x}$ given $\vec{a}$ may be assumed, which yields $$P(x_1, \ldots, x_I | \vec{a}) = \sum_{i=1}^{I} p_i(x = x_i | \vec{a})$$

so that the probability $p_i(x=x_i | \vec{a})$ is the one component left to be specified to arrive at a model for $P(\vec{x})$.

Logistic models have secured a prominent position among models for categorical data. The GDM may also be specified as a model with a logistic link between an argument, which depends on the random variables involved and some real valued parameters, and the probability of the observed response.

Using the above definitions, the GDM may be defined as follows. Let $$Q=(q_{ik}), i=1, \ldots, I, k=1, \ldots, K$$

be a binary I×K matrix, that is $q_{ik} \in \{0,1\}$. Let $$(\gamma_{ikx}), i=1, \ldots, I, k=1, \ldots, K, x=1, \ldots, m_i$$

be a cube of real valued parameters, and let $\beta_{ix}$ for $i=1, \ldots, I$ and $x \in \{0, \ldots, m_i\}$ be real valued parameters. Then define $$p_i(x | \vec{a}) = \frac{\exp\left(\beta_{ix} + \sum_k \gamma_{ikx} h(q_{ik}, a_k)\right)}{1 + \sum_{y=1}^{m_i} \exp\left(\beta_{iy} + \sum_k \gamma_{iky} h(q_{ik}, a_k)\right)}$$

It may convenient to constrain the $\gamma_{ikx}$ somewhat an to specify real valued function $h(q_{ik}, a_k)$ and the $a_k$ in a way that allows emulation of models frequently used in educational measurements and psychometrics. It may be convenient to choose $h(q_{ik}, a_k)=q_{ik}a_k$, and $\gamma_{ikx}=x\gamma_{ik}$.

The GDM has some unfortunate limitations. Primarily, it is not equipped to handle unobserved partitions, or subpopulations, in the examinees.

Thus, there is a need for a diagnostic model that may be extended to handle unobserved subpopulations.

BRIEF DESCRIPTION OF DRAWINGS

Aspects, features, benefits and advantages of the embodiments of the present invention will be apparent with regard to the following description, appended claims and accompanying drawings where:

SUMMARY OF THE INVENTION

Figure 1:
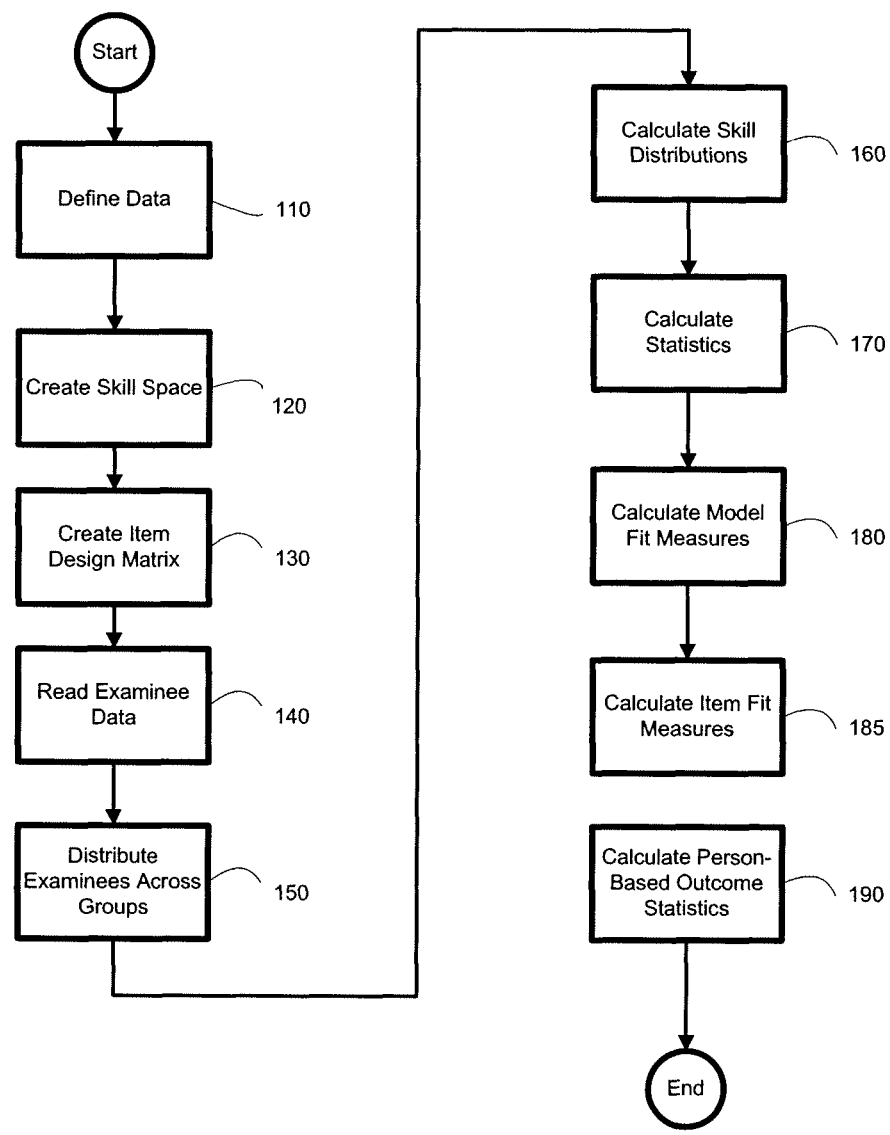
FIG. 1 is a flow chart illustrating an exemplary method of applying diagnosis models to examinee data.

Disclosed herein is a method of analyzing examinee item response data comprising constructing a diagnosis model for reporting skill profiles of examinees, wherein the diagnosis model comprises at least a variable representing unobserved subpopulations, creating an item design matrix, distributing examinees across the unobserved subpopulations, iteratively estimating values for a plurality of variables within the diagnosis model, and reporting the estimated values to a user.

Also disclosed herein is method of analyzing examinee item response data comprising constructing a diagnosis model for reporting skill profiles of examinees, wherein the diagnosis model comprises at least a variable representing unobserved subpopulations and a cluster variable, creating an item design matrix, distributing examinees across the unobserved subpopulations, iteratively estimating values for a plurality of variables within the diagnosis model, and reporting the estimated values to a user.

DETAILED DESCRIPTION OF THE INVENTION

As mentioned above, the GDM has some limitations. In particular, the GDM does not take into account different behaviors among various subpopulations. That is, the probability of an observation $\vec{x}$ may depend not only the unobserved latent trait, $\vec{a}$, but also on a subpopulation identifier g. The subpopulation identifier g may be observed, but is often unobserved. Mixture distribution models are useful because observations from different subpopulations may either differ in their distribution of skills or in their approach to the test items, or in both. A discrete mixture distribution in the setup of random variables as introduced above includes an unobserved grouping indicator $g_n$ for n=1, ..., N. The complete data for examinee n then becomes $(\vec{x}_n, \vec{a}_n, g_n)$, of which only $\vec{x}_n$ is observed in mixture distribution models. A mixture GDM, or MGDM, will hereinafter be disclosed.

In order accommodate different groups, the conditional independence assumption has to be modified, that is $$P(\vec{x} \mid \vec{a}, g) = P(x_1, \ldots, x_I \mid \vec{a}, g) = \prod_{i=1}^{I} p_i(x = x_i \mid \vec{a}, g)$$

Moreover, assume that the conditional probability of the components $x_i$ of $\vec{x}$ depends on nothing but $\vec{a}$ and g, that is, $$P(\vec{x} \mid \vec{a}, g, z) = \prod_{i=1}^{I} p_i(x = x_i \mid \vec{a}, g) = P(\vec{x} \mid \vec{a}, g) \quad \text{Equation 1}$$

for any random variable z. In mixture models, when the $g_n$ are not observed, the marginal probability of a response vector $\vec{x}$ needs to be found, that is, $$P(\vec{x}) = \sum_g \pi_g(\vec{x} \mid g) \quad \text{Equation 2}$$

where $P(\vec{x} \mid g) = \Sigma_{\vec{a}} p(\vec{a} \mid g) P(x \mid \vec{a}, g)$. The $\pi_g = P(G=g)$ may be referred to as mixing proportions, or class sizes. The class-specific probability of a response vector $\vec{x}$ given skill pattern $\vec{a}$ the MGDM may then be defined as $$P(\vec{x} \mid \vec{a}, g) = \quad \text{Equation 3}$$

$$\prod_{i=1}^{I} P(x_i \mid \vec{a}, g) = \prod_{i=1}^{I} \left[ \frac{\exp\left(\beta_{ixy} + \sum_k x_i \gamma_{ikg} q_{ik} a_k\right)}{1 + \sum_y \exp\left(\beta_{iyg} + \sum_k y \gamma_{ikg} q_{ik} a_k\right)} \right]$$

with class-specific item difficulties $\beta_{ixg}$. The $\gamma_{ikg}$ are the slope parameters relating skill k to item i in class g. This equation may be used to model, for instance, both polytomous and binary data.

One special case of the MGDM is a model that assumes measurement invariance across populations, which is expressed in the equality of $p(\vec{x} \mid \vec{a}, g)$ across groups or, more formally $$P(x_i \mid \vec{a}, g) = p(x_i \mid \vec{a}, c) \text{ for all } i \in \{1, \ldots, I\} \text{ and all } g, c \in \{1, \ldots, G\}$$

Under this assumption, the MGDM equation may be rewritten without the group index g in the conditional response probabilities, so that $$P(\vec{x}) = \sum_g \pi_g P(\vec{x} \mid g) = \sum_g \pi_g \sum_{\vec{a}} p(\vec{a} \mid g) \prod_{i=1}^{I} P(x_i \mid \vec{a}) \quad \text{Equation 4}$$

Note that the differences between groups are only present in the $p(\vec{a} \mid g)$, so that the skill distribution is the only component with a condition on g in the above equation.

The MGDM may be expanded to introduce an additional structure, referred to as a cluster variable. This expanded model may be referred to as a Hierarchical GDM, or HGDM. This cluster variable may be used to account for correlations in the data. One example for clustered data is the responses to educational assessments sampled from students within schools or classrooms. For instance, it seems plausible to assume that students within schools are more similar than students across schools. In addition to the grouping variable g, the hierarchical extension of the GDM assumes that each observation n is characterized by an outcome $s_n$ on a clustering variable s. The clusters identified by this outcome may be schools, classrooms, or other sampling units representing the hierarchical structure of the data collection. The (unobserved) group membership g, is thought of as an individual classification variable; for two examinees n≠m there may be two different group memberships, that is, both $g_n = g_m$ and $g_n \neq g_m$ are both permissible even if they belong to the same cluster (i.e., $s_n = s_m$).

Moreover, it may be assumed that the skill distribution depends only on the group indicator g and no other variable, that is, $$P(\vec{a} \mid g, z) = P(\vec{a} \mid g) \quad \text{Equation 5}$$

for any random variable z. More specifically, for the clustering variable s, $$P(g) = \sum_{s=1}^{S} p(s) P(g \mid s).$$

With Equation 5, $$P(g \mid s) P(\vec{a} \mid g) = p(g \mid s) P(\vec{a} \mid g, s) = P(\vec{a}, g \mid s)$$

for $$P(\vec{x} \mid g, s) = \sum_a P(\vec{a} \mid g, s) P(\vec{x} \mid \vec{a}, g, s) = \sum_a p(\vec{a} \mid g) P(\vec{x} \mid \vec{a}, g) = P(\vec{x} \mid g)$$

with Equations 1 and 5. Then the marginal distribution of a response pattern $\vec{x}$ in the HGDM is given by $$P(\vec{x}) = \sum_s p(s) \sum_g P(g \mid s) \sum_a P(\vec{a} \mid g)(P(\vec{x} \mid \vec{a}, g) \quad \text{Equation 6}$$

where, as above with respect to the MGDM, the $p(\vec{a}|g)$ denote the distribution of the skill patterns in group g, and the $p(\vec{x}|\vec{a}, g)$ denote the distribution of the response vector $\vec{x}$ conditional on skill pattern $\vec{a}$ and group g. An HGDM that assumes measurement invariance across clusters and across groups is defined by $$P(\vec{x}) = \sum_s p(s) \sum_g P(g \mid s) \sum_a P(\vec{a} \mid g)(P(\vec{x} \mid \vec{a}) \quad \text{Equation 7}$$

with conditional response probabilities $p(x|\vec{a}) = \Pi_i p(x_i|\vec{a})$ that do not depend on cluster or group variables.

The increase in complexity of HGDMs over, for instance, the MGDM, lies in the fact that the group distribution P(g|s) depends on the cluster variable s. This increases the number of group or class size parameters depending on the number of clusters # {s: s∈S}.

Hereinafter, an exemplary method of applying the above models to examinee data will be described with respect to FIG. 1. First, data is defined 110. More specifically, defining data may comprise steps of defining item response variables or defining mixture components. Then, a skill space is created 120. More specifically, creating a skill space may comprise defining the number of skills and defining the assumed skill levels (e.g., how many, which numerical anchor) for each of the assumed skill variables. Then, an item design matrix (e.g., a Q-matrix) is created 130, which may relate the item response variables to the assumed skill variables. Then, data for each examinee may be read 140. For instance, this step may comprise reading item response variables and grouping variables. Then, the examinees may be randomly distributed 150 across groups. Then, initial skill distributions are calculated 160.

Then, the MGDM or HGDM statistics are calculated 170. In a preferred embodiment, this is performed using an expectation-maximization (EM) algorithm such as the one disclosed in "Multilevel latent class models," by J. K Vermunt, published in Sociological Methodology 33, which is incorporated by reference herein. The EM algorithm will be described in more detail as it applies to the HGDM. One of ordinary skill will appreciate that this method is easily applicable to the MGDM as well.

Since the data are structured hierarchically, the first step is to define the complete data for the HGDM. Let S denote the number of clusters in the sample, and let $N_s$ denote the number of examinees in cluster s, for s=1, . . . , S. Then, let $x_{ins}$ denote the i-th response of the n-th examinee in cluster s and let $\vec{x}_{ns}$ denote the complete observed response vector of examinee n in cluster s. Further, let $a_{kns}$ denote the k-th skill of examinee n in cluster s and let $\vec{a}_{ns}$ denote the skill pattern of examinee n in cluster s. Finally, let $g_{ns}$ denote the group membership of examinee n in cluster s. Note that only the $x_{ins}$ are observed, as are the cluster sizes $N_s$ and the number of clusters S. The $s_{kns}$ and $g_{ns}$ are unobserved and have to be inferred by making model assumptions and calculating posterior probabilities such as P(g|s) and P($\vec{a}$, g| $\vec{x}$, s).

For the complete data (i.e., the observed data $\vec{x}$ in conjunction with the unobserved skill profiles $\vec{a}$ and group membership g), the marginal likelihood is $$L = \prod_{s=1}^{S} \prod_{n=1}^{N_s} P(\vec{x}_{ns}, \vec{a}_{ns}, \vec{g}_{ns}; s)$$

that is, a sum over cluster-specific distributions of the complete data. With the above assumptions, $$L = \prod_{s=1}^{S} \prod_{n=1}^{N_s} P(\vec{x}_{ns} \mid \vec{a}_{ns}, \vec{g}_{ns}) p(\vec{a}_{ns} \mid \vec{g}_{ns}) p(g_{ns} \mid s)$$

which equals $$L = L_{\vec{x}} \times L_{\vec{a}} \times L_{\vec{g}}$$

with $$L_{\vec{x}} \times L_{\vec{a}} \times L_{\vec{g}} = \left( \prod_{s=1}^{S} \prod_{n=1}^{N_s} P(\vec{x}_{ns} \mid \vec{a}_{ns}, g_{ns}) \right) \left( \prod_{s=1}^{S} \prod_{n=1}^{N_s} p(\vec{a}_{ns} \mid \vec{a}_{ns}, g_{ns}) \right) \left( \prod_{s=1}^{S} \prod_{n=1}^{N_s} p(g_{ns} \mid s) \right)$$

Note that these components may be rearranged and rewritten as $$L_{\vec{x}} = \prod_{s=1}^{S} \prod_{n=1}^{N_s} \prod_{i=1}^{I} P(x_{ns} \mid \vec{a}_{ns}, g_{ns}) = \prod_g \prod_{\vec{a}} \prod_i \prod_x P(X_i = x \mid \vec{a}, g)^{n_i(x, \vec{a}, g)}$$

with n($x_i$, i, $\vec{a}$, g)=$\Sigma_s$ n($x_i$, i, $\vec{a}$, g, s) is the frequency of category $x_i$ responses on item I for examinees with skill pattern $\vec{a}$ in group g. Also, $$L_g = \prod_{s=1}^{S} \prod_{n=1}^{N_s} p(\vec{a}_{ns} \mid g_{ns}) = \prod_{\vec{a}} \prod_g p(\vec{a} \mid g)^{n(\vec{a}; g)}$$

where n($\vec{a}$; g) is the frequency of skill pattern $\vec{a}$ in group g. Finally, $$L_g = \prod_{s=1}^{S} \prod_{n=1}^{N_s} p(g_{ns} \mid s) = \prod_s \prod_g p(g \mid s)^{n(g; s)}$$

holds. The n(g; s) represents the frequency of group membership in g in cluster S.

The EM algorithm cycles through the generation of expected values and the maximization of parameters given these preliminary expectations until convergence is reached. This process is well known in the art and is described in, for instance, The EM-algorithm and extensions by McLachlan et al., published by Wiley, which is incorporated by reference herein. For the HGDM, there are three different types of expected values to be generated in the E-step: First, $\hat{n}_i(x, \vec{a}, g) = \Sigma_s \Sigma_n 1\{x_{ins}=s\}P(\vec{a}, g|\vec{x}_{ns}, s)$ is the expected frequency of response x to item I for examinees with skill pattern $\vec{a}$ in group g, estimated across clusters and across examinees within clusters. Second, $\hat{n}(\vec{a}, g) = \Sigma_s \Sigma_n P(\vec{a}, g|\vec{x}_{ns}, s)$ is the expected frequency of skill pattern $\vec{a}$ and group g, estimated across clusters and across examinees within clusters. Finally, $\hat{n}(g,s) = \Sigma_n P(g|\vec{x}_{ns}, s)$ is the expected frequency of group g in cluster s, estimated across examinees in that cluster. For the first and second type of the required expected counts, this involves estimating $$P(\vec{a}, g \mid \vec{x}, s) = \frac{P(\vec{x}, s, \vec{a}, g)}{\sum_g P(\vec{x}, s, g)} = \frac{P(\vec{x} \mid \vec{a}, g) p(\vec{a} \mid g) p(g \mid s)}{\sum_g P(\vec{x}, s, g)}$$

with $$P(\vec{a}, g \mid \vec{x}, s) = \frac{P(\vec{x}, s, \vec{a}, g)}{\sum_g P(\vec{x}, s, g)} = \frac{P(\vec{x} \mid \vec{a}, g) p(\vec{a} \mid g) p(g \mid s)}{\sum_g P(\vec{x}, s, g)}$$

for each response pattern $\vec{x}_{ns}$, for s=1, ..., S and n=1, ..., $N_s$. For the third type of expected count, use $$p(g \mid \vec{x}, s) = \sum_{\vec{a}} P(\vec{a}, g \mid \vec{x}, s)$$

which is equivalent to $$p(g \mid \vec{x}, s) = \frac{P(\vec{x}, s, g)}{\sum_g P(\vec{x}, s, g)} = \frac{\sum_{\vec{a}} P(\vec{x} \mid \vec{a}, g) p(\vec{a} \mid g) p(g \mid s)}{\sum_g \left[\sum_{\vec{a}} P(\vec{x} \mid \vec{a}, g) p(\vec{a} \mid g) p(g \mid s)\right]}$$

This last probability then allows one to estimate the class membership g given both the observed responses $\vec{x}$ and the known cluster membership s. The utility of the clustering variable may be evaluated in terms of increase of the maximum a postereori probabilities $p(g|\vec{x}, s)$ over $p(g|\vec{x})$. If the clustering variable s is informative for the classification g, a noticeable increase of the maximum posterior probabilities should be observed. The improvement should also be seen in terms of the marginal log-likelihood if s is informative for g.

Referring back to FIG. 1, once the statistics have converged, model fit measures, log-likelihoods, and related measures may be calculated 180. Then, item fit measures are calculated 185. Finally, person-based outcome statistics may be calculated 190. Calculating person-based outcome statistics may include calculating most probable group membership and most probable skill level for each skill for each examinee. These statistics, item-fit measures, log-likelihoods, and model fit measures may be presented to a user in a human-readable fashion, such as a computer display, or printout.

Figure 2:
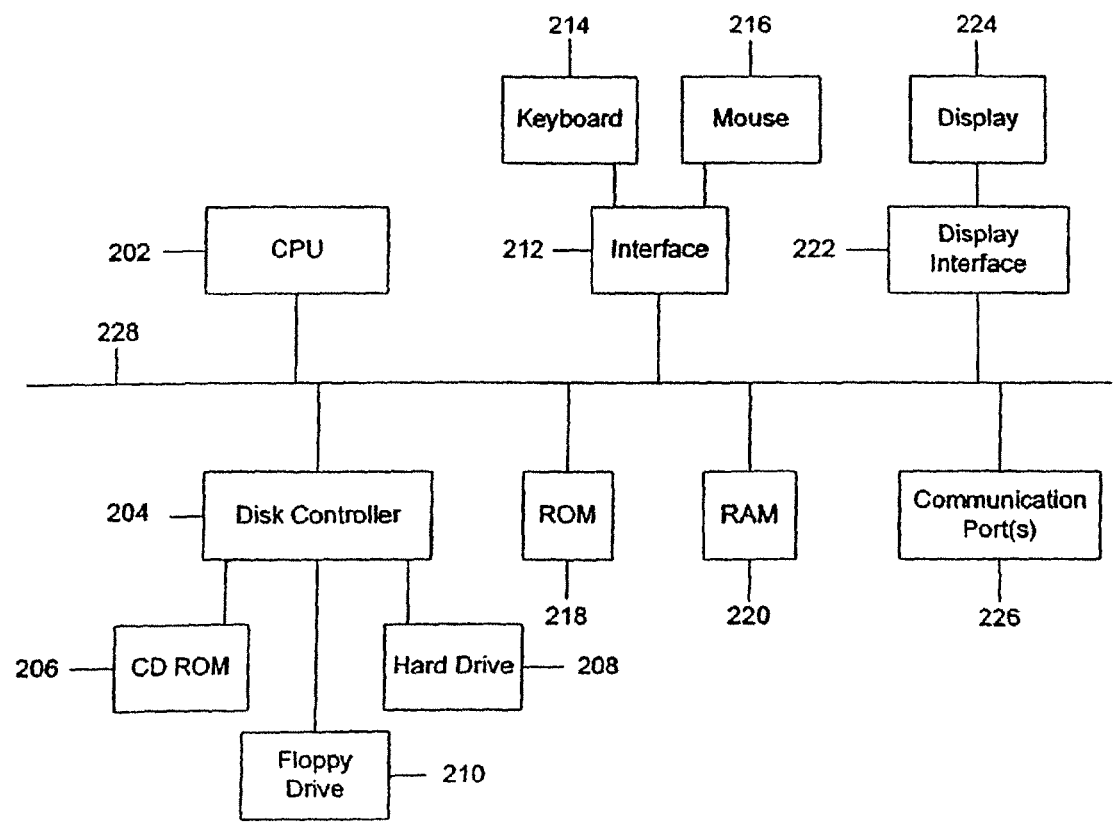
FIG. 2 is a diagram of an exemplary system upon which the above-referenced method may operate.

FIG. 2 is a block diagram of exemplary internal hardware that may be used to contain or implement the program instructions of a system embodiment. Referring to FIG. 2, a bus 228 serves as the main information highway interconnecting the other illustrated components of the hardware. CPU 202 is the central processing unit of the system, performing calculations and logic operations required to execute a program. Read only memory (ROM) 218 and random access memory (RAM) 220 constitute exemplary memory devices.

A disk controller 204 interfaces with one or more optional disk drives to the system bus 228. These disk drives may be external or internal floppy disk drives such as 210, CD ROM drives 206, or external or internal hard drives 208. As indicated previously, these various disk drives and disk controllers are optional devices.

Program instructions may be stored in the ROM 218 and/or the RAM 220. Optionally, program instructions may be stored on a computer readable medium such as a floppy disk or a digital disk or other recording medium, a communications signal or a carrier wave.

An optional display interface 222 may permit information from the bus 228 to be displayed on the display 224 in audio, graphic or alphanumeric format. Communication with external devices may optionally occur using various communication ports 226. An exemplary communication port 226 may be attached to a communications network, such as the Internet or an intranet.

In addition to the standard computer-type components, the hardware may also include an interface 212 which allows for receipt of data from input devices such as a keyboard 214 or other input device 216 such as a remote control, pointer and/or joystick.

The diagnostic models described herein may be used in connection with, for instance and without limitation, English language testing, national large scale assessments, international assessments, or K-12 accountability testing. For instance, the MGDM and HGDM may be used in connection with Test of Engliesh as a Foreign Language (TOEFL) results.

While illustrative embodiments of the invention have been shown herein, it will be apparent to those skilled in the art that the invention may be embodied still otherwise without departing from the spirit and scope of the claimed invention.

The invention claimed is:

1. A computer-implemented method of analyzing examinee item response data comprising:
    constructing a diagnosis model using a computer system for reporting skill profiles of examinees, wherein the diagnosis model comprises a variable representing unobserved subpopulation groups according to an expression:

$$P(\vec{x} \mid \vec{a}, g) = \prod_{i=1}^{I} \left[ \frac{\exp\left(\beta_{ixg} + \sum_k x_i \gamma_{ikg} q_{ik} a_k\right)}{1 + \sum_y \exp\left(\beta_{iyg} + \sum_k y \gamma_{ikg} q_{ik} a_k\right)} \right],$$

where
    $\vec{x} = (x_1, \ldots, x_I)$ is a response vector for I question items,
    $\vec{a} = (a_1, \ldots, a_K)$ is a K-dimensional skill pattern,
    g is the variable representing unobserved subpopulation groups, $P(\vec{x}|\vec{a}, g)$ is a group-specific probability of the response vector $\vec{x}$ given the skill pattern $\vec{a}$, $q_{ik}$ are parameters relating question items to skills, $\gamma_{ikg}$ are slope parameters relating skill k to question item i in group g, $\beta_{ixg}$ and $\beta_{iyg}$ are item difficulty parameters for group g;

creating an item design matrix using the computer system;

obtaining examinee item response data;

distributing the examinee item response data across the unobserved subpopulation groups;

iteratively estimating, using the computer system, values for a plurality of variables indicative of item difficulty and skill requirements for question items using the diagnosis model; and reporting the estimated values to a user.

2. The method of claim 1, wherein the examinee item response data are randomly distributed across the unobserved subpopulation groups.

3. The method of claim 1, wherein the examinee item response data is polytomous.

4. The method of claim 1, wherein the examinee item response data is binary.

5. The method of claim 1, wherein the plurality of variables comprise variables representing slope parameters relating a skill to an item.

6. The method of claim 1, further comprising:
defining item response variables;
defining a number of skills;
defining the assumed skill levels; and
calculating initial skill distributions.

7. The method of claim 1, wherein the diagnosis model is based on an assumption of measurement invariance across subpopulation groups.

8. A computer-implemented method of analyzing examinee item response data comprising:
constructing a diagnosis model using a computer system for reporting skill profiles of examinees, wherein the diagnosis model comprises a variable representing unobserved subpopulation groups and a cluster variable that accounts for correlations in the examinee item response data, according to an expression:

$$P(\vec{x}) = \sum_s p(s) \sum_g P(g|s) \sum_{\vec{a}} P(\vec{a}|g) P(\vec{x}|\vec{a}, g),$$

where
$\vec{x}=(x_1, \ldots, x_I)$ is a response vector for I question items,
$\vec{a}=(a_1, \ldots, a_K)$ is a K-dimensional skill pattern,
g is the variable representing unobserved subpopulation groups,
s is the cluster variable,
$P(\vec{x})$ is a marginal probability of the response vector $\vec{x}$,
p(s) is a distribution of the cluster variable,
P(g|s) is a group distribution depending on the cluster variable,
$p(\vec{a}|g)$ is a distribution of the skill pattern $\vec{a}$ in group g, $P(\vec{x}|\vec{a}, g)$ is a group-specific probability of the response vector $\vec{x}$ given the skill pattern $\vec{a}$, wherein $$P(\vec{x}|\vec{a}, g) = \prod_{i=1}^{I} \left[ \frac{\exp\left(\beta_{ixg} + \sum_k x_i \gamma_{ikg} q_{ik} a_k\right)}{1 + \sum_y \exp\left(\beta_{iyg} + \sum_k y \gamma_{ikg} q_{ik} a_k\right)} \right],$$

where
$q_{ik}$ are parameters relating question items to skills,
$\gamma_{ikg}$ are slope parameters relating skill k to question item i in group g,
$\beta_{ixg}$ and $\beta_{iyg}$ are item difficulty parameters for group g;

creating an item design matrix using the computer system;

obtaining examinee item response data;

distributing the examinee item response data across the unobserved subpopulation groups;

iteratively estimating, using the computer system, values for a plurality of variables indicative of item difficulty and skill requirements for question items using the diagnosis model; and reporting the estimated values to a user.

9. The method of claim 8, wherein the examinee item response data are randomly distributed across the unobserved subpopulation groups.

10. The method of claim 8, wherein the examinee item response data is polytomous.

11. The method of claim 8, wherein the examinee item response data is binary.

12. The method of claim 8, wherein the plurality of variables comprise variables representing slope parameters relating a skill to an item.

13. The method of claim 8, further comprising:
defining item response variables;
defining a number of skills;
defining the assumed skill levels; and
calculating initial skill distributions.

14. The method of claim 8, wherein the diagnosis model is based on an assumption of measurement invariance across subpopulation groups.

15. The method of claim 1, wherein the item design matrix is an IxK matrix that relates I item responses and K skills.

16. The method of claim 1, further comprising:
calculating statistics for the diagnosis model using an expectation-maximization algorithm.

17. The method of claim 8, wherein the item design matrix is an IxK matrix that relates I item responses and K skills.

18. The method of claim 8, further comprising:
calculating statistics for the diagnosis model using an expectation-maximization algorithm.

19. A system for analyzing examinee item response data, the system comprising:
a processing system;
a processor-readable storage medium containing one or more programming instructions that, when executed, cause the processing system to execute steps comprising:
constructing a diagnosis model using a computer system for reporting skill profiles of examinees, wherein the diagnosis model comprises a variable representing unobserved subpopulation groups according to an expression:

$$P(\vec{x}\mid \vec{a}, g) = \prod_{i=1}^{I}\left[\frac{\exp\left(\beta_{ixg} + \sum_{k} x_i \gamma_{ikg} q_{ik} a_k\right)}{1 + \sum_{y}\exp\left(\beta_{iyg} + \sum_{k} y\gamma_{ikg} q_{ik} a_k\right)}\right],$$

where
- $\vec{x}=(x_1, \ldots, x_I)$ is a response vector for I question items,
- $\vec{a}=(a_1, \ldots, a_K)$ is a K-dimensional skill pattern,
- g is the variable representing unobserved subpopulation groups,
- $P(\vec{x}\mid \vec{a}, g)$ is a group-specific probability of the response vector $\vec{x}$ given the skill pattern $\vec{a}$,
- $q_{ik}$ are parameters relating question items to skills,
- $\gamma_{ikg}$ are slope parameters relating skill k to item i in group g,
- $\beta_{ixg}$ and $\beta_{iyg}$ are item difficulty parameters for group g;

creating an item design matrix;
obtaining examinee item response data;
distributing the examinee item response data across the unobserved subpopulation groups;
iteratively estimating values for a plurality of variables indicative of item difficulty and skill requirements for question items using the diagnosis model; and
reporting the estimated values to a user.

20. The system of claim 19, wherein the plurality of variables comprise variables representing slope parameters relating a skill to an item.

21. The system of claim 19, wherein the processing system is configured to execute steps comprising:
defining item response variables;
defining a number of skills;
defining the assumed skill levels; and
calculating initial skill distributions.

22. The system of claim 19, wherein the diagnosis model is based on an assumption of measurement invariance across subpopulation groups.

23. The system of claim 19, wherein the item design matrix is an IxK matrix that relates I item responses and K skills.

24. The system of claim 19, the processing system being configured to calculate statistics for the diagnosis model using an expectation-maximization algorithm.

25. A system for analyzing examinee item response data, the system comprising:
a processing system; and
a memory,
the processing system being configured to execute steps comprising:
constructing a diagnosis model for reporting skill profiles of examinees, wherein the diagnosis model comprises a variable representing unobserved subpopulation groups and a cluster variable that accounts for correlations in the examinee item response data, according to an expression:

$$P(\vec{x}) = \sum_{s} p(s)\sum_{g} P(g\mid s)\sum_{\vec{a}} P(\vec{a}\mid g)P(\vec{x}\mid \vec{a}, g),$$

where
- $\vec{x}=(x_1, \ldots, x_I)$ is a response vector for I question items,
- $\vec{a}=(a_1, \ldots, a_K)$ is a K-dimensional skill pattern,
- g is the variable representing unobserved subpopulation groups,
- s is the cluster variable,
- $P(\vec{x})$ is a marginal probability of the response vector $\vec{x}$,
- p(s) is a distribution of the cluster variable,
- P(g|s) is a group distribution depending on the cluster variable,
- $p(\vec{a}\mid g)$ is a distribution of the skill pattern $\vec{a}$ in group g,
- $P(\vec{x}\mid \vec{a}, g)$ is a group-specific probability of the response vector $\vec{x}$ given the skill pattern $\vec{a}$, wherein $$P(\vec{x}\mid \vec{a}, g) = \prod_{i=1}^{I}\left[\frac{\exp\left(\beta_{ixg} + \sum_{k} x_i \gamma_{ikg} q_{ik} a_k\right)}{1 + \sum_{y}\exp\left(\beta_{iyg} + \sum_{k} y\gamma_{ikg} q_{ik} a_k\right)}\right],$$

where
- $q_{ik}$ are parameters relating question items to skills,
- $\gamma_{ikg}$ are slope parameters relating skill k to question item i in group g,
- $\beta_{ixg}$ and $\beta_{iyg}$ are item difficulty parameters for group g;

creating an item design matrix;
obtaining examinee item response data;
distributing the examinee item response data across the unobserved subpopulation groups;
iteratively estimating values for a plurality of variables indicative of item difficulty and skill requirements for question items using the diagnosis model; and
reporting the estimated values to a user.

26. The system of claim 25, wherein the plurality of variables comprise variables representing both item difficulties and slope parameters relating a skill to an item.

27. The system of claim 25, wherein the processing system is configured to execute steps comprising:
defining item response variables;
defining a number of skills;
defining the assumed skill levels; and
calculating initial skill distributions.

28. The system of claim 25, wherein the diagnosis model is based on an assumption of measurement invariance across subpopulation groups.

29. The system of claim 25, wherein the item design matrix is an IxK matrix that relates I item responses and K skills.

30. The system of claim 25, the processing system being configured to calculate statistics for the diagnosis model using an expectation-maximization algorithm.

31. A non-transitory computer readable medium comprising programming instructions for analyzing examinee item response data, the programming instructions adapted to cause a processing system to execute steps comprising:
constructing a diagnosis model using a computer system for reporting skill profiles of examinees, wherein the diagnosis model comprises a variable representing unobserved subpopulation groups according to an expression:

$$P(\vec{x} \mid \vec{a}, g) = \prod_{i=1}^{I} \left[ \frac{\exp\left(\beta_{ixg} + \sum_{k} x_i \gamma_{ikg} q_{ik} a_k\right)}{1 + \sum_{y} \exp\left(\beta_{iyg} + \sum_{k} y \gamma_{ikg} q_{ik} a_k\right)} \right],$$

where
- $\vec{x} = (x_1, \ldots, x_I)$ is a response vector for I question items,
- $\vec{a} = (a_1, \ldots, a_K)$ is a K-dimensional skill pattern,
- g is the variable representing unobserved subpopulation groups,
- $P(\vec{x} \mid \vec{a}, g)$ is a group-specific probability of the response vector $\vec{x}$ given the skill pattern $\vec{a}$,
- $q_{ik}$ are parameters relating question items to skills,
- $\gamma_{ikg}$ are slope parameters relating skill k to item i in group g,
- $\beta_{ixg}$ and $\beta_{iyg}$ are item difficulty parameters for group g;

creating an item design matrix;
obtaining examinee item response data;
distributing the examinee item response data across the unobserved subpopulation groups;
iteratively estimating values for a plurality of variables indicative of item difficulty and skill requirements for question items using the diagnosis model; and
reporting the estimated values to a user.

32. The non-transitory computer readable medium of claim 31, wherein the plurality of variables comprise variables representing slope parameters relating a skill to an item.

33. The non-transitory computer readable medium of claim 31, the programming instructions adapted to cause a processing system to execute steps comprising:
defining item response variables;
defining a number of skills;
defining the assumed skill levels; and
calculating initial skill distributions.

34. The non-transitory computer readable medium of claim 31, wherein the diagnosis model is based on an assumption of measurement invariance across subpopulation groups.

35. The non-transitory computer readable medium of claim 31, wherein the item design matrix is an I×K matrix that relates I item responses and K skills.

36. The non-transitory computer readable medium of claim 31, the programming instructions adapted to cause a processing system to calculate statistics for the diagnosis model using an expectation-maximization algorithm.

37. A non-transitory computer readable medium comprising programming instructions for analyzing examinee item response data, the programming instructions adapted to cause a processing system to execute steps comprising:
constructing a diagnosis model for reporting skill profiles of examinees, wherein the diagnosis model comprises a variable representing unobserved subpopulation groups and a cluster variable that accounts for correlations in the examinee item response data, according to an expression:

$$P(\vec{x}) = \sum_{s} p(s) \sum_{g} P(g \mid s) \sum_{\vec{a}} P(\vec{a} \mid g) P(\vec{x} \mid \vec{a}, g),$$

where
- $\vec{x} = (x_1, \ldots, x_I)$ is a response vector for I question items,
- $\vec{a} = (a_1, \ldots, a_K)$ is a K-dimensional skill pattern,
- g is the variable representing unobserved subpopulation groups,
- s is the cluster variable,
- $P(\vec{x})$ is a marginal probability of the response vector $\vec{x}$,
- p(s) is a distribution of the cluster variable,
- P(g|s) is a group distribution depending on the cluster variable,
- $p(\vec{a} \mid g)$ is a distribution of the skill pattern $\vec{a}$ in group g,
- $P(\vec{x} \mid \vec{a}, g)$ is a group-specific probability of the response vector $\vec{x}$ given the skill pattern $\vec{a}$, wherein $$P(\vec{x} \mid \vec{a}, g) = \prod_{i=1}^{I} \left[ \frac{\exp\left(\beta_{ixg} + \sum_{k} x_i \gamma_{ikg} q_{ik} a_k\right)}{1 + \sum_{y} \exp\left(\beta_{iyg} + \sum_{k} y \gamma_{ikg} q_{ik} a_k\right)} \right],$$

where
- $q_{ik}$ are parameters relating question items to skills,
- $\gamma_{ikg}$ are slope parameters relating skill k to question item i in group g,
- $\beta_{ixg}$ and $\beta_{iyg}$ are item difficulty parameters for group g;

creating an item design matrix;
obtaining examinee item response data;
distributing the examinee item response data across the unobserved subpopulation groups;
iteratively estimating values for a plurality of variables indicative of item difficulty and skill requirements for question items using the diagnosis model; and
reporting the estimated values to a user.

38. The non-transitory computer readable medium of claim 37, wherein the plurality of variables comprise variables representing slope parameters relating a skill to an item.

39. The non-transitory computer readable medium of claim 37, the programming instructions adapted to cause a processing system to execute steps comprising:
defining item response variables;
defining a number of skills;
defining the assumed skill levels; and
calculating initial skill distributions.

40. The non-transitory computer readable medium of claim 37, wherein the diagnosis model is based on an assumption of measurement invariance across subpopulation groups.

41. The non-transitory computer readable medium of claim 37, wherein the item design matrix is an I×K matrix that relates I item responses and K skills.

42. The non-transitory computer readable medium of claim 37, the programming instructions adapted to cause a processing system to calculate statistics for the diagnosis model using an expectation-maximization algorithm.

43. The method of claim 1, further comprising calculating most probable skill level for a given skill and most probable group membership for each examinee.

44. The method of claim 8, further comprising calculating most probable skill level for a given skill and most probable group membership for each examinee.

45. The system of claim 19, wherein the steps include:
calculating most probable skill level for a given skill and most probable group membership for each examinee.

46. The system of claim 25, wherein the steps include:
calculating most probable skill level for a given skill and most probable group membership for each examinee.

47. The non-transitory computer readable medium of claim 31, wherein the steps include:
calculating most probable skill level for a given skill and most probable group membership for each examinee.

48. The non-transitory computer readable medium of claim 37, wherein the steps include:
calculating most probable skill level for a given skill and most probable group membership for each examinee.

49. The method of claim 1, wherein the unobserved subpopulation groups comprise groups of the examinees.

50. The method of claim 8, wherein the unobserved subpopulation groups comprise groups of the examinees.

51. The method of claim 19, wherein the unobserved subpopulation groups comprise groups of the examinees.

52. The method of claim 25, wherein the unobserved subpopulation groups comprise groups of the examinees.

53. The non-transitory computer readable medium of claim 31, wherein the unobserved subpopulation groups comprise groups of the examinees.

54. The non-transitory computer readable medium of claim 37, wherein the unobserved subpopulation groups comprise groups of the examinees.

55. The method of claim 8, wherein the estimated values reported include data for examinees of a same school or a same classroom.

56. The method of claim 25, wherein the estimated values reported include data for examinees of a same school or a same classroom.

57. The method of claim 37, wherein the estimated values reported include data for examinees of a same school or a same classroom.

* * * * *